United States Patent
Shen (10) Patent No.: US 9,823,477 B1
(45) Date of Patent: Nov. 21, 2017

(54) HEAD MOUNTED DISPLAY CONTENT CAPTURE AND SHARING

(71) Applicant: Futurewei Technologies, Inc., Plano, TX (US)

(72) Inventor: Tian Shen, Santa Clara, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 15/144,112

(22) Filed: May 2, 2016

(51) Int. Cl.
| G02B 27/01 | (2006.01) |
| G06T 15/00 | (2011.01) |
| G06T 19/00 | (2011.01) |
| G06F 3/0484 | (2013.01) |
| H04L 29/06 | (2006.01) |
| H04W 4/00 | (2009.01) |

(52) U.S. Cl.
CPC ..... *G02B 27/0176* (2013.01); *G02B 27/0172* (2013.01); *G06F 3/04847* (2013.01); *G06T 19/006* (2013.01); *H04L 67/38* (2013.01); *H04W 4/008* (2013.01); *G02B 2027/0123* (2013.01); *G02B 2027/0138* (2013.01)

(58) Field of Classification Search
CPC .......... G02B 27/017; G02B 2027/0138; G02B 2027/0123
See application file for complete search history.

(56) References Cited

U.S. PATENT DOCUMENTS

| 2010/0259619 | A1 | 10/2010 | Nicholson | |
| 2013/0242262 | A1* | 9/2013 | Lewis | G02B 27/0093 351/209 |
| 2014/0348484 | A1* | 11/2014 | Erwin | A42B 3/042 386/223 |
| 2015/0105035 | A1* | 4/2015 | de Oliveira | H04B 1/385 455/90.3 |
| 2015/0348327 | A1* | 12/2015 | Zalewski | G06F 3/01 345/419 |

(Continued)

FOREIGN PATENT DOCUMENTS

| CN | 103020983 | 4/2013 |
| CN | 104473717 | 4/2015 |
| CN | 105404005 | 3/2016 |

OTHER PUBLICATIONS

"International Application No. PCT/CN2017/082541, International Search Report and Written Opinion dated Jul. 19, 2017", [English Translation], (Jul. 19, 2017), 11 pgs.

*Primary Examiner* — Lixi C Simpson
(74) *Attorney, Agent, or Firm* — Schwegman Lundberg & Woessner, P.A.

(57) ABSTRACT

A virtual reality goggle includes a goggle shaped body having multiple cameras mounted thereon. A display is supported by the goggle shaped body. A support extends between sides of the goggle shaped body and includes multiple cameras. Circuitry is coupled to receive video from the multiple cameras, the video comprising a composite field of view of approximately 360 degrees about the goggle, the circuitry to couple to a wireless communication device to transmit the received video to networked processing services, and to receive stitched stereoscopic three dimensional virtual reality video from the networked processing services, the circuitry further coupled to provide the received stitched stereoscopic three dimensional virtual reality video for display.

20 Claims, 6 Drawing Sheets

(56) References Cited

U.S. PATENT DOCUMENTS

| | | | |
|---|---|---|---|
| 2016/0093108 A1* | 3/2016 | Mao | A63F 13/42 345/633 |
| 2016/0210785 A1* | 7/2016 | Balachandreswaran | G02B 27/017 |
| 2016/0309134 A1* | 10/2016 | Venkataraman | G02B 27/017 |
| 2017/0052595 A1* | 2/2017 | Poulos | G02B 27/0103 |

* cited by examiner

HEAD MOUNTED DISPLAY CONTENT CAPTURE AND SHARING

FIELD OF THE INVENTION

The present disclosure is related to content capture and sharing of content, and in particular to a head mounted display for capturing and sharing virtual reality content.

BACKGROUND

There are many stand-alone products currently available to capture video from multiple directions to capture sufficient video for a 360 degree virtual reality view. The captured video may be stitched together via a separate computer or cloud based application and made available to a virtual reality head mounted display for viewing the resulting virtual reality video. The process of capturing, sensing, and then viewing can be cumbersome and involve using several different devices.

SUMMARY

A virtual reality goggle includes a goggle shaped body having multiple cameras mounted thereon. A display is supported by the goggle shaped body. A support extends between sides of the goggle shaped body and includes multiple cameras. Circuitry is coupled to receive video from the multiple cameras, the video comprising a composite field of view of approximately 360 degrees about the goggle, the circuitry to couple to a wireless communication device to transmit the received video to networked processing services, and to receive stitched stereoscopic three dimensional virtual reality video from the networked processing services, the circuitry further coupled to provide the received stitched stereoscopic three dimensional virtual reality video for display.

A method includes capturing video from multiple cameras supported by a virtual reality goggle while being worn by a user, the video including a composite field of view of approximately 360 degrees about the user, transmitting the received video to networked processing services for stitching the received video into a stereoscopic three dimensional virtual reality video, receiving the stitched stereoscopic three dimensional virtual reality video from the networked processing services, and displaying the received stitched stereoscopic three dimensional virtual reality video in a display of the virtual reality goggle.

A computer readable storage device has instruction stored thereon for execution by circuitry to perform operations. The operations include capturing video from multiple cameras supported by a virtual reality goggle while being worn by a user, the video including a composite field of view of approximately 360 degrees about the user, transmitting the received video to networked processing services for stitching the received video into a stereoscopic three dimensional virtual reality video, receiving the stitched stereoscopic three dimensional virtual reality video from the networked processing services, and displaying the received stitched stereoscopic three dimensional virtual reality video in a display of the virtual reality goggle.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a smartphone or portable computer, personal computer, server or other computer system, turning such computer system into a specifically programmed machine.

Figure 1:
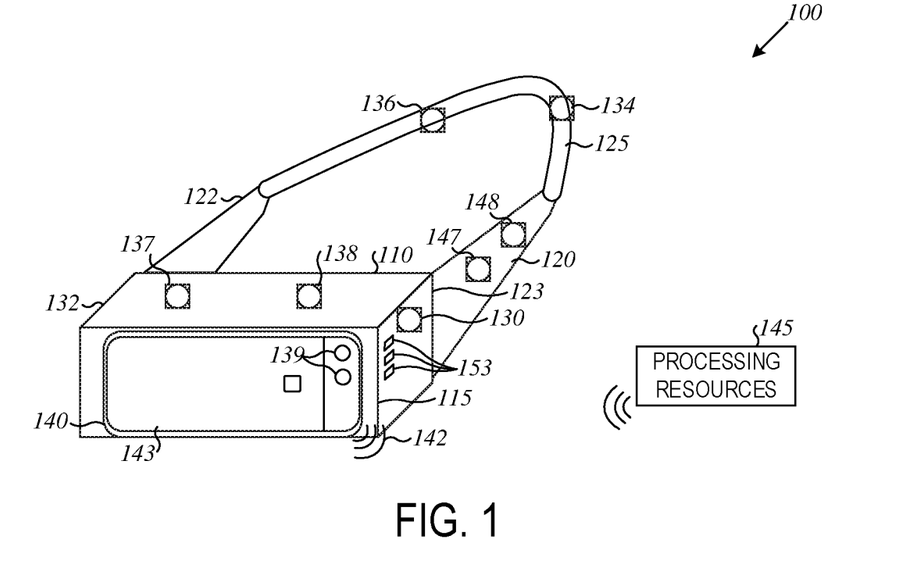
FIG. 1 is a block perspective view of a virtual reality head mounted display system according to an example embodiment.

FIG. 1 is a block perspective view of a virtual reality head mounted display (HMD) system 100. System 100 includes a goggle shaped body 110 containing a display 115 mounted within the body 110 where it may be viewed by a user wearing the system 100. Display 115 is not visible in FIG. 1, but is shown in block form in FIG. 2. The body 110 may be shaped to fit on a user like a pair of goggles, with suitable contours for being supported by a nose bridge of a user and spacing the display 115 within the body 110 a distance from the eyes of the user such that the display 115 can be viewed by the user. Separate displays may be used for each eye to provide the ability to provide a three dimensional virtual reality view. Suitable displays, including see through displays with optional projected images for a control interface, are currently available and may be incorporated in to the system 100.

System 100 also includes multiple cameras disposed to capture multiple fields of view about the head of the user wearing system 100. Side stems 120, 122 are coupled to the body 110 and positioned to extend from a front of a face of the user to the ears of the user to provide further support, in a manner similar to stems of eyeglasses. The stems 120 and 122 may optionally be coupled to the body via hinges at 123, facilitating folding of the system 100 into a smaller carrying footprint. The hinges 123 may simply be a thinner portion of the stems, allowing bending of the stems at the hinges 123. Sides of the body 110 may also include hinges to facilitate folding. A strap 125 may extend from ends of the stems around the back of the head of the user when system 100 is worn by the user.

In one embodiment, the cameras may include a camera 130 mounted on a left side of the body 110, having a field of view to a user's left side. A camera 132 (not visible in FIG. 1) may similarly be mounted on a right side of the body to provide a field of view to a user's right side. Two cameras indicated at 134 and 136 may be mounted on the strap 125 to provide fields of view behind a user, referred to as rearward views with respect to a wearer, or the body 110 itself. One or more further cameras 137, 138 may be mounted on a top of the body 110 to provide a field of view above the head of the user. Each camera may also include one or more microphones to capture audio. A sixth camera or cameras 139 may be supported on a front face of the body 110 to capture video with a field of view in front of the user wearing the system 100, referred to as a forward view with respect to a wearer, or the body 110 itself.

In one embodiment, the stems 120 and 122 combined with the strap 125 comprise a support that both holds the goggle shaped body 110 on a wearer and provides structure to support the multiple cameras that provide side and rearward fields of view. The support may comprise other structures, such as longer stems that may support a rearward facing camera at ends of the stems to provide the rear field of view. In one embodiment, the support may be a single strap that extends from the goggle shaped body around the head of a user with multiple cameras supported to provide side and rear fields of view. Other structures may also be utilized that help hold the goggle on a wearer and provide the desired fields of view.

In some embodiments, the various fields of view of the cameras overlap to some extent to allow extraction of depth information from the captured video via common triangulation techniques. Areas not overlapping may be estimated by stitching functions using extrapolation and other techniques. Stitching is a known process that combines images with overlapping fields of view to produce a view that has a wider field of view than any single image. Several cloud based services are available to perform stitching services as further described below.

Additional cameras may be positioned on the body 110, stems 120, 122, and strap 125 to provide additional overlapping fields of view for a significant part if not all of a 360 degree lateral view about the user's head, facilitating creation of a more robust 3D virtual reality (VR) view from a user's perspective. In one embodiment, the video captured by the multiple cameras comprises a composite field of view of approximately 360 degrees about a wearer of the system 100. As indicated above, there may be gaps in the approximately 360 degree view that can be estimated. If the gaps are too large for estimation, the composite field of view is no longer considered to be approximately 360 degrees. Side stems 120 may contain one or more cameras as indicated on stem 120 at 147 and 148. Side stem 122 may also contain similar cameras.

System 100 in one embodiment may include circuitry 140 that receives the video, optionally including audio, from each camera. A Wi-Fi, cellular, or other network device 142 may be used by the circuitry 140 to upload the captured video to processing resources 145 coupled to the network, such as cloud based resources. The circuitry 140 and network device 142 may be built into and supported by the body 110 in some embodiments.

In one embodiment, the display is designed into the body 110 of system 100. Videos from the cameras are received by circuitry 140, which may use network device 142 via a cellular or Wi-Fi connection to provide the videos to the processing device 145. Processing device 145 will run services like JUMP Assembler to stitch the videos. Stitched 3D videos are sent back to the system 100 to be displayed via the built in displays as driven by circuitry 140.

In some embodiments, videos from the cameras may be sent via circuitry 140 to a smart phone 143 via a micro USB interface. The smart phone 143 may provide both a display and a connection to the processing device 145. Received stitched video from processing device 145 may be displayed via a split screen on a display of the smart phone 143 that is visible through the goggle shaped body 110. The screen may be split in two to provide a separate display for each eye of a wearer of the goggle body 110 to provide a stereoscopic view of the stitched 3D virtual reality video.

In still further embodiments, the display may be designed into the body 110 of the system 100. Videos from the cameras may be sent through network device 142 via a wireless HD (a high definition video content wireless protocol) connection to a portable computing device to be carried close to but separate from the body 110, such as in a pocket of a user. The computing device may perform stitching and provide the stitched stereoscopic video back to the circuitry 140 for driving an internal display of the body 110.

In one embodiment, smart phone 143 may be supported by the body 110 of system 110, either as shown on a front exterior face of the body 110, or on or in a side or bottom portion of the body 110 that does not obstruct vision of the user through a see through display 115. When mounted as shown, the smart phone may include the camera 139 providing the forward view. Camera 139 may also be separate from the smart phone and supported directly by the body 110. In a further embodiment, the smart phone 143 may separate from the body 110 and be coupled via a wired or short wireless mechanism to circuitry 140. The smart phone may provide the communication functions of the wireless communication device 142.

The smart phone 143 may have a touch interface to provide an icon based touch interface via one or more apps all integrated into system 100 for controlling the capture and sending of video to the processing resources 145, and receiving stitched stereoscopic virtual reality 3D video. The term, "stereoscopic" refers to the use of two images of an object or scene that are taken at slightly different angles, and when viewed together, create an impression of depth and solidity. The circuitry 140 may then drive the display 115 to provide the user with a virtual reality experience by providing stereoscopic images to each of the separate displays 115 for each eye.

The stereoscopic images may also be shared with others via user interfaces provided via the touch interface, which may be a touchscreen of a smartphone, or a touch panel of the head mounted display system 100 tied to circuitry 140. In some embodiment, the touch interface functions may be implemented via a virtual reality gaze input, voice, or some other input method. Thus, all the functions of video capture, uploading, viewing, and sharing may be performed by a single integrated unit.

In further embodiments, the circuitry 140 is disposed on a side of body 110 such that it does not interfere with a see through display 115. The circuitry 140 may be used to implement transceiver functions and user interface functions via integrated circuits and mechanical, gaze tracking cameras, microphones, or touch sensors 153 on the body 110 for controlling the capture of video by the cameras, uploading, viewing, and sharing.

In still further embodiments, a user interface may be provided by the display 115 and interacted with by user motions as captured by the cameras and provided to the circuitry 140. Typical controls for the capture may include "Record" and "Stop". Editing controls may also be provided for clipping portions of video. Each captured video feed may include synchronized time information and optionally include an identification of the camera that captured the video. Typical controls for uploading may include selection of video from a directory of captured video, which may be named by a user or simply time stamped, and an upload icon or other selection mechanism. Sharing may be done by entering user contact information, or selecting users to share the video with from an existing list.

In one embodiment, the uploading, sharing, and viewing of the captured video and stitched stereoscopic 3D VR video may be done as it is captured, providing a near real time experience for the user and for the users the stitched video is shared with, delayed only by network and processing delays, which delays may decrease with improved performance. The capture, uploading, and sharing may be set up for a single actuation at the beginning of an activity in some embodiments. The sharing may be via any social media mechanism or may simply involve the texting or emailing of a link to the stitched 3D VR video provided by the processing resources 145.

In one example use of the system 100, a user may wear system 100 while skydiving or any other activity. Starting the video capture may be accomplished by simply selecting a record and share feature at any point in the skydive. Selection of the record and share features starts the video capture and uploading to the cloud for stitching, and sharing it with others who may watch and listen on their own head mounted 3D VR displays, which may or may not provide similar integrated capture, upload, view, and share functions. Many other activities, such as ziplining, skiing, hiking, climbing, biking, etc., are all candidates for quickly capturing a 3D experience and sharing a 3D VR version with others.

Trying to perform the functions necessary to share 3D VR while skydiving using prior video capture mechanisms which may require separate applications and devices to first capture the video, finding a Wi-Fi hotspot, uploading, all while switching through multiple devices and apps, such as social media, would be nearly impossible and if possible, extremely inconvenient.

Figure 2:
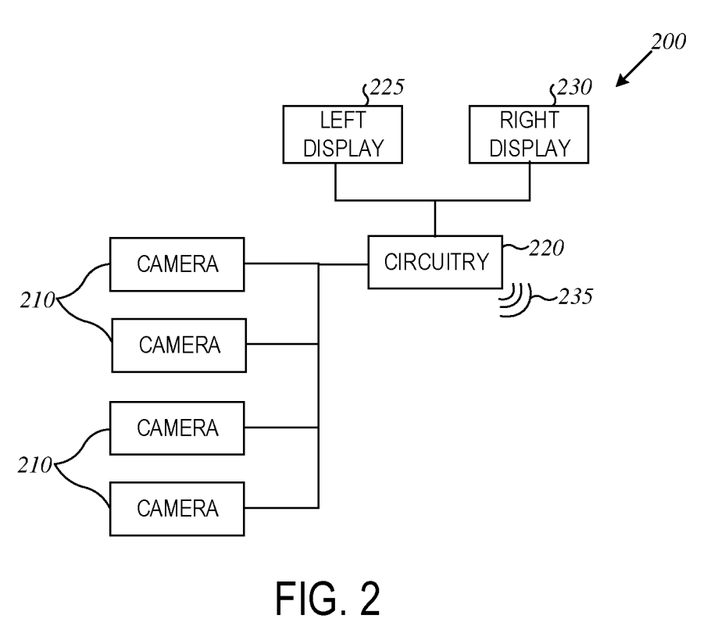
FIG. 2 is a block schematic diagram of a head mounted virtual reality (VR) capture, viewing, and sharing system according to an example embodiment.

FIG. 2 is a block schematic diagram of a head mounted VR capture, viewing, and sharing system 200, showing components which may be used in implementing system 100. The diagram illustrates multiple cameras 210 coupled to the circuitry 220, which drives a left display 225 and a right display 230 to provide 3D content to a user. The circuitry also provides a wireless connection indicated at 235 for sending captured video and receiving stitched video for viewing and some editing functions. The circuitry may also run a browser for interfacing with remote resources via a web based interface, wherein the remote resources may include web sites that provide services, such as video stitching to generate 3D VR content and links to that content that can be viewed by a user and shared with other users, such as via text, email, social media, and other methods. The circuitry 220 may also generate a graphical user interface for display by the displays 225 and 230.

As previously mentioned, in some embodiments, the displays may be see-through displays with the ability to project the graphical user interface to different portions of a field of view provided by the displays. The circuitry 200 may comprise a smart phone or other circuitry with processing resources and transceiver, and may be supported by the body 110 outside the field of view so as not to obstruct a user's view during participation in an activity. In further embodiments, a typical field of view may be displayed on non-transparent displays that are not see-through, so the user can observe their actual environment.

Figure 3A:
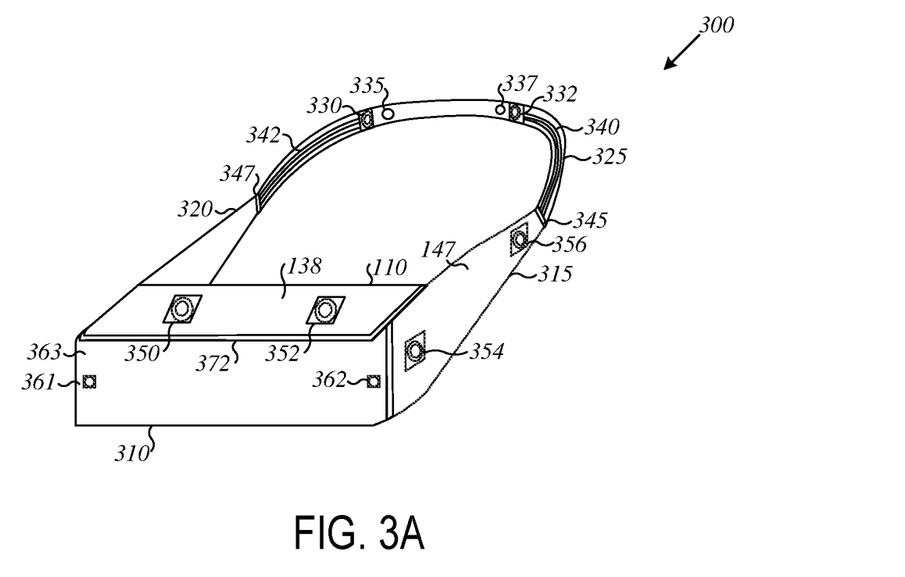
FIGS. 3A and 3B are respective front and rear perspective block diagrams of a head mounted display system according to an example embodiment.
Figure 3B:
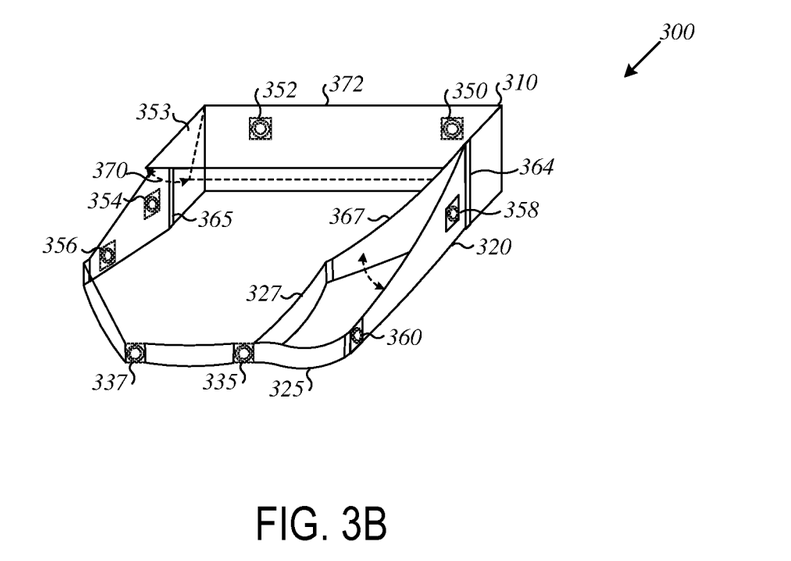

FIGS. 3A and 3B are front and back perspective representations of a virtual reality head mounted display system 300. System 300 includes a head mounted display 310 supported by two stems 315 and 320 coupled to sides of the head mounted display 310 such that they support the head mounted display 310 on the head of a user. A head mounted display strap 325 may also be coupled to ends of the steps 315 and 320 to extend around the head of the user when worn.

In addition, the head mounted display strap 325 may include multiple cameras 330, 332 and microphones 335, 337 mounted to provide images and sound from the back side of a user when wearing the head mounted display system 300. A pair of CSI (camera interface specification by the Mipi® alliance) ribbon cables are shown at 340, 342 mounted on or in the strip 325. The cables 340 and 342 are coupled to the cameras 330, 332 to provide signals to the head mounted display via a snap on ribbon cable receptacles 345, 347 positioned in ends of the stems 315, 320. Microphones 335, 337 may utilize an I$^2$S (integrated interchip sound—a communication protocol designed to carry digital data) bus to carry signals to the stems.

The stems contain conductors for providing the camera and microphone signals to circuitry 220, which may be mounted in the stems 315, 332 in one embodiment. One or more additional cameras 350, 352 may be mounted on or otherwise supported by a top portion 353 of the head mounted display 310 and cameras 354, 356, 358, 360 supported by stems 310, 320 in further embodiments. One or more forward looking cameras 361, 362 may also be supported by a front portion 363 of the head mounted display, such as near a periphery or other portion of the head mounted display 310 that do not significantly affect a user's field of view through the head mounted display in embodiments, where the display is a see through display.

In one embodiment, stems 320 and 322 are coupled to the head mounted display 310 via hinges 364 and 365 which permit the stems 320 and 322 to folded inward as indicated at 367 to provide for compact storage of the system 300. The strap 325 is flexible, as are the cables 340, 342. The top portion 353 of the head mounted display 310 may also be folded downward as indicated by arrow 370 by use of a hinged portion 372 coupling the top portion 353 to the front portion 363 of the head mounted display 310.

Figure 4:
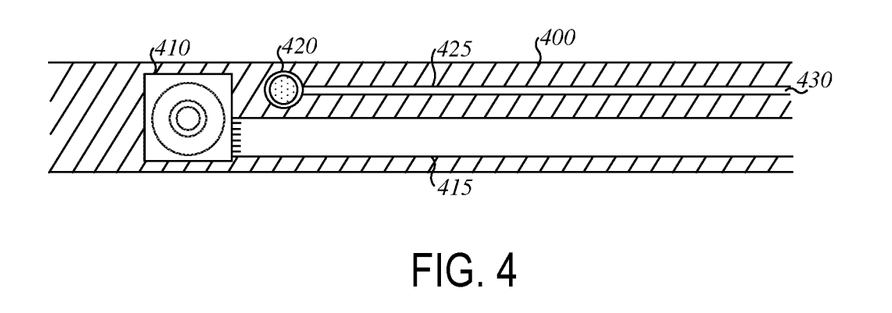
FIG. 4 is a partial longitudinal block view of a head mounted display strap showing a camera and CSI ribbon cable supported in or on the strap according to an example embodiment.

FIG. 4 is a partial longitudinal block view of a head mounted display strap 400 showing a camera 410 and CSI ribbon cable 415 supported in or on the strap 400. A microphone 420 is also supported in or on the strap 400 and is coupled to an I$^2$S interface cable 425. Both the CSI ribbon cable 415 and I$^2$S interface cable 425 are shown extending through the strap 400 towards one of the stems as indicated by arrow 430.

Figure 5:
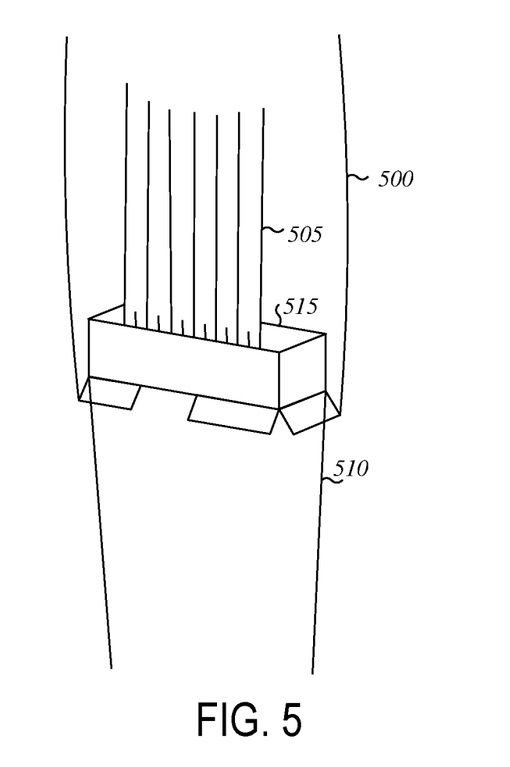
FIG. 5 is a detailed block diagram illustrating a strap containing a CSI ribbon cable coupled to a stem via a snap on connector according to an example embodiment.

FIG. 5 is a detailed block diagram illustrating a strap 500 containing a CSI ribbon cable 505 coupled to a stem 510 via a snap on connector 515. One or more clamps 520 may be used to secure the cable 505, and thereby the strap 500, to the stem 510. The I$^2$S audio cable may be similarly connected via the snap on connector 515.

Figure 6:
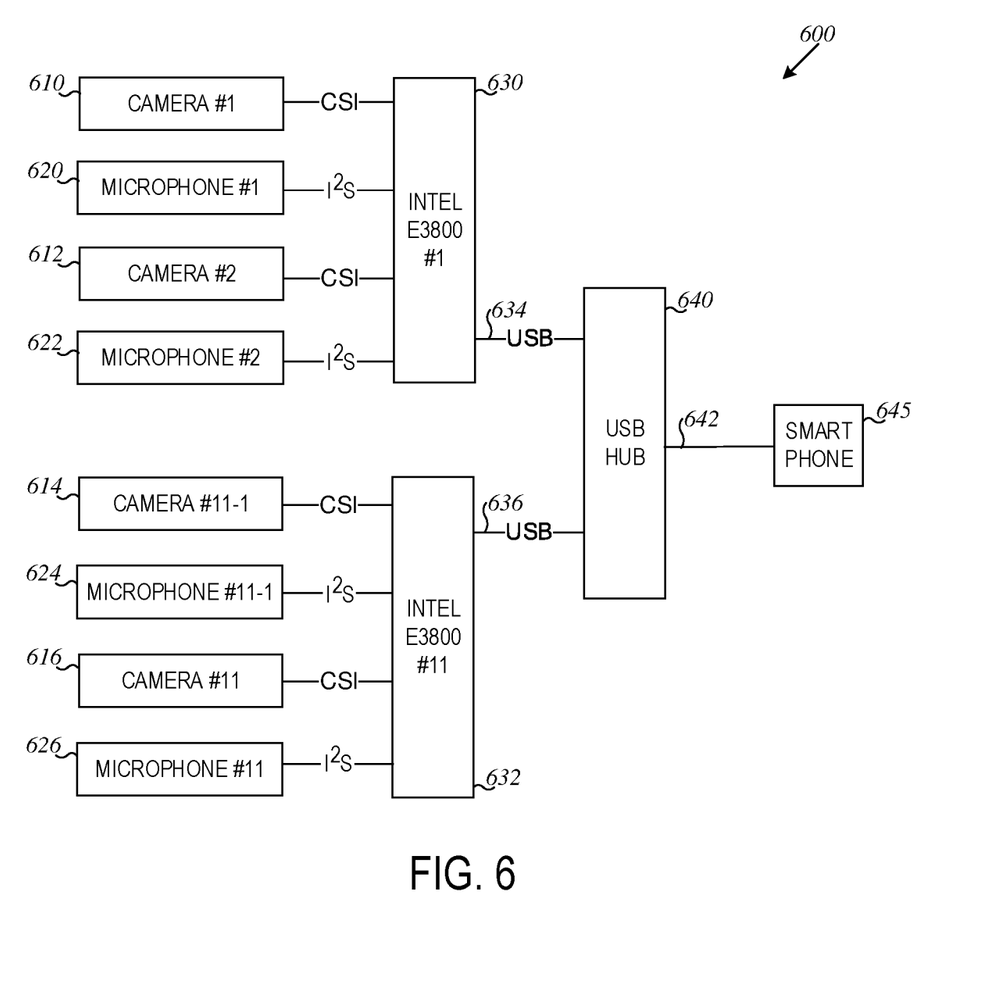
FIG. 6 is a block schematic diagram illustrating devices and circuitry of a head mounted display system according to an example embodiment.

FIG. 6 is a block diagram illustrating devices and circuitry generally at 600. Multiple cameras 610, 612, 614, 616, and microphones 620, 622, 624, 626 are shown coupled via CSI and I$^2$S cables to processors indicated at 630, 632. In one embodiment, one of each of the processors 630, 632 reside in respective stems of the head mounted display system and perform functions related to capturing and processing video and audio. The processors 630 and 632 may be couple via USB (universal serial bus) cables 634, 636 to a USB hub 640. The USB hub 640, which may be supported by the head mounted display 310, combines signals from the cables 634, 636 and provides them on a communications connection 642 to a smart phone 645 for further processing, such as sending wirelessly for stitching. The smart phone may be supported by the head mounted display as illustrated in FIG. 1, or may be supported by one or more of the stems, or may be otherwise supported by a user, such as a wearer of the head mounted display system 100. The communications connection 642 may be a wired or wireless connection in various embodiments that has a sufficient bandwidth for transferring video and audio information.

Figure 7:
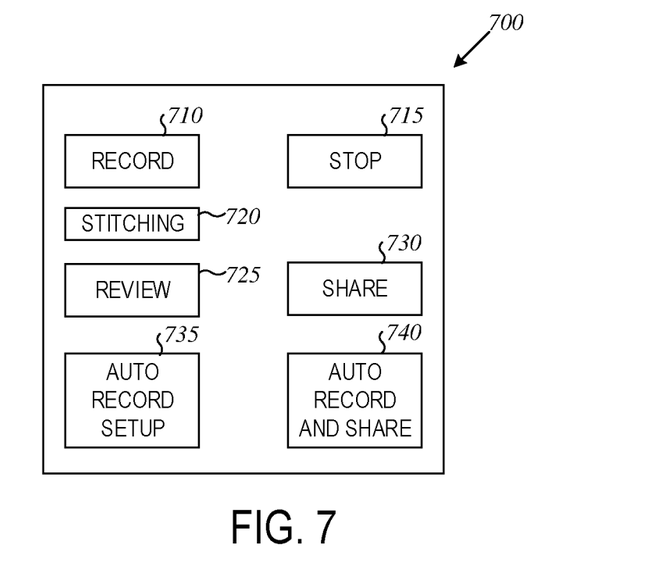
FIG. 7 is an example graphical user interface for use by a user in operating the VR system according to an example embodiment.

FIG. 7 is an example graphical user interface 700 for use by a user in operating system 100, 200, and 300. Several icons are included for invoking functions performed by system 100, 200, and 300. A record icon 710 may be selected to begin recording and a stop icon 715 may be selected to stop the recording. Many different methods may be used for selecting an icon, such as gaze based, external navigation and selection buttons or touchscreens supported on the body 110, or other methods.

A stitching icon 720 may be selected to begin stitching the just recorded video in one embodiment. The stitching icon 720 may also present a further screen for selecting recordings from different times, which may be shown in list form, for stitching, and may further provide an interface to set up stitching resources. Note that in some embodiments, the video may be provided via a network connection to stitching resources as it is being captured.

A view icon 725 may be used to either automatically review 3D VR content that was just stitched, or may also be used to select content from a list of content that is available. The 3D VR content may be obtained for viewing via a link provided by the stitching service. In some embodiments, interface 700 may be provided by the stitching resources and viewed via a browser or browser app running on the system 100. The content may be viewed via a browser running on the circuitry, or by an app designed for viewing the 3D VR content. The app, or a remote server or other resources such as the resources providing the stitching may provide some basic editing functions, such as clipping in order to shorten the 3D VR content to be shared, or even deleting the content.

In some uses of the system 100, 200, 300, the user may desire to share a 3D VR content as an activity is occurring. An auto record function is available to allow the user to have the system record video, send the video for stitching, and share the stereoscopic 3D VR content as quickly as it is stitched and available for viewing. Such a sequence may be controlled by selection of an auto-record setup icon indicated at 735. Selection of the icon allows selection of a stitching resource and sharing mechanism prior to beginning recording. Once those selections are made, an auto record and share icon 740 may be selected, and video recording will begin, be communicated with the stitching resource, and automatically shared as previously specified.

Figure 8:
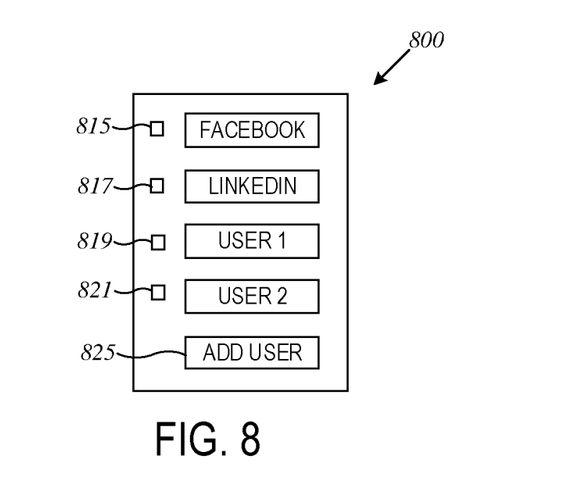
FIG. 8 is an example set up screen providing checkboxes for selecting a social media sharing mechanism according to an example embodiment.

FIG. 8 is an example set up screen 800 providing checkboxes 815, 817 for selecting a social media sharing mechanism, such as Facebook, LinkedIn, or Twitter. Checkboxes 819, 821 may be used to select users for sharing via one or more email or text based addresses, or other sharing mechanisms. An icon 825 may be provided to add users. The selections in one embodiment results in the creation of a record and auto share script for execution by the circuitry. In one embodiment, the script is prewritten with variables corresponding to the selections, including script to control the uploading of video to a stitching service, providing credentials for use of such services. The variables are provided with values corresponding to the boxes that are checked via the set up screen 800.

A continue icon may navigate the user back to screen 700, where by pressing a single record and auto share icon 740, the record and auto share script is executed, causing recording, transmission, and sharing to be initiated and performed without further action required by the user. The sharing will be coordinating with the stitching resources via the circuitry 200 by obtaining a link from the stitching resources where the stereoscopic 3D VR content may be viewed in near real time as available and providing that link to the sharing mechanisms and addresses provided.

Figure 9:
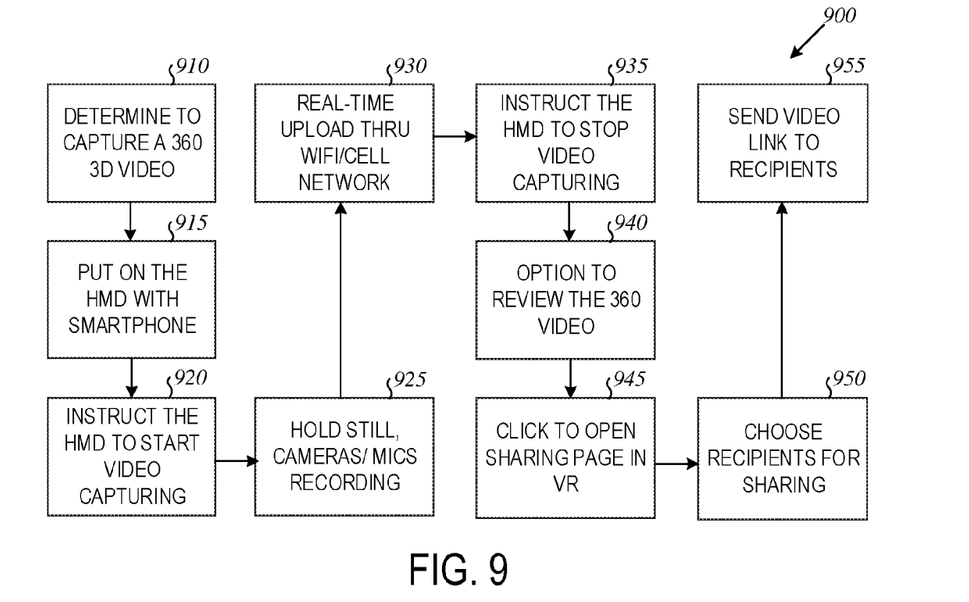
FIG. 9 is a block flow diagram illustrating a method of capturing, uploading, viewing, and sharing 3D VR video according to an example embodiment.

FIG. 9 is a block flow diagram illustrating a method 900 of capturing, uploading, viewing, and sharing 3D VR video according to an example embodiment. At 910, a user determines that they want to capture a 360 degree 3D video and puts on a virtual reality head mounted display system 100 with an optional smart phone or circuitry 140, 200, 300. At 920, the user may use the graphical user interface 700 to instruct the system 100 to start capturing video. In one embodiment, the user may hold still as indicated at 925 as the cameras and microphones record video and audio. The user may move around while recording in some embodiments. The video and audio may be uploaded in real-time through a Wi-Fi or cellular network at 830 in some embodiments. At 535, the user may use the graphical user interface 700 to instruct the system 100 to stop video capture.

The user may receive the stitched together video comprising stereoscopic 3D VR content at 940, review it, and optionally edit it, such as by clipping it. A user may open a sharing page in VR at 945, which may be hosted by resources performing the video stitching, and may select recipients for sharing at 950 through such sharing page. At 955, the user may send a stereoscopic 3D VR link to recipients for their viewing pleasure.

Figure 10:
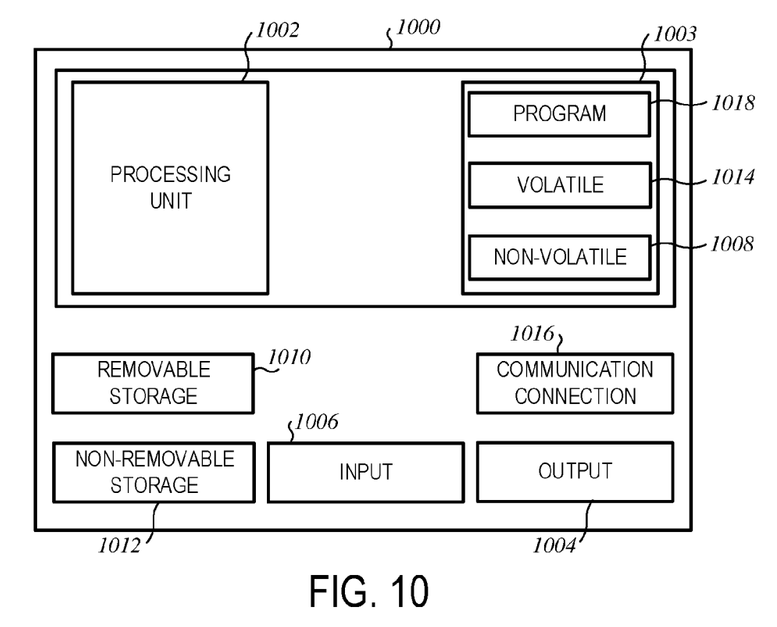
FIG. 10 is a block diagram illustrating circuitry for implementing algorithms and performing methods according to example embodiments.

FIG. 10 is a block diagram illustrating circuitry for implementing algorithms and performing methods according to example embodiments. All components need not be used in various embodiments, and as described above, the circuitry may be divided into different components that operate together, including circuitry for driving the display, providing networking communications, executing browser functions, providing interfaces. FIG. 10 is also representative of a smart phone, such as a mobile phone that may be used for one or more of the functions performed by the circuitry.

One example computing device in the form of a computer 1000 may include a processing unit 1002, memory 1003, removable storage 1010 such as an SD card or similar storage device, and non-removable storage 1012. Although the example computing device is illustrated and described as computer 1000, the computing device may be in different forms in different embodiments. For example, the computing device may be a smart phone or circuitry utilizing one or more elements as illustrated and described with regard to FIG. 10.

Memory 1003 may include volatile memory 1014 and non-volatile memory 1008. Computer 1000 may include— or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) and electrically erasable programmable read-only memory (EEPROM), flash memory or other memory technologies or any other medium capable of storing computer-readable instructions.

Computer 1000 may include or have access to a computing environment that includes input 1006, output 1004, and a communication connection 1016. Output 1004 may include a display device, such as a touchscreen, that also may serve as an input device. The input 1006 may include one or more of a touchscreen, touchpad, microphone, camera, one or more device-specific buttons, one or more sensors integrated within or coupled via wired or wireless data connections to the computer 1000, and other input devices. The computer 1000 in one embodiment operates in a networked environment using a communication connection to connect to one or more remote computers, such as database servers and video stitching services.

Computer-readable instructions stored on a computer-readable medium are executable by the processing unit 1002 of the computer 1000. RAM and ROM are some examples of articles including a non-transitory computer-readable medium such as a storage device. The terms computer-readable medium and storage device do not include carrier waves to the extent carrier waves are deemed too transitory.

EXAMPLES

1. In example 1, a virtual reality goggle includes a goggle shaped body 110 having multiple cameras 130, 132, 137, 138 mounted thereon. A display 225, 230 is supported by the goggle shaped body 110 in a position viewable by a wearer of the goggle shaped body 110. A support 120, 122, 125 extends between sides of the goggle shaped body 110 and includes multiple cameras 134, 136, 147, 148. Circuitry 140 coupled to receive video from the multiple cameras, the video comprising a composite field of view of approximately 360 degrees about the goggle, the circuitry 140 to couple to a wireless communication device 142 to transmit the received video to networked processing services 145, and to receive stitched stereoscopic three dimensional virtual reality video from the networked processing services 145, the circuitry 140 further coupled to provide the received stitched stereoscopic three dimensional virtual reality video on the display 225, 230.

2. The virtual reality goggle of example 1 wherein the goggle shaped body 110 has a first body camera 130 supported on a left side of the body and a second body camera 132 supported on a right side of the body providing left and right oriented fields of view.

3. The virtual reality goggle of example 2 wherein the goggle shaped body 110 has a third body camera 139 supported on a front face of the body providing a forward oriented field of view.

4. The virtual reality goggle of example 3 wherein the goggle shaped body 110 has a fourth body camera 137, 138 supported on a top face of the body providing an upward oriented field of view.

5. The virtual reality goggle of example 4 wherein the support comprises two stems 120, 122, each stem coupled to different sides of the goggle shaped body 110 at one end of each stem, and a strap 125 coupling the other ends of each stem to each other, wherein the multiple cameras 134, 136 included in the support are supported by the strap 125 and provide rearward oriented fields of view.

6. The virtual reality goggle of any of examples 1-5 wherein the wireless communication device 142 comprises a cellular transceiver.

7. The virtual reality goggle of example 6 wherein the cellular transceiver comprises a smart phone 143 supported by the goggle shaped body 110.

8. The virtual reality goggle of any of examples 1-7 wherein the circuitry 140 is configured to provide a user interface 700 including a record option selector 710 and an option to share 730 the stereoscopic three dimensional virtual reality video.

9. The virtual reality goggle of example 8 wherein the user interface 700, 800 includes a set up option 735 to identify the networked processing services and the users 815, 817, 819, 821, 815 with which to share the stereoscopic three dimensional virtual reality video.

10. The virtual reality goggle of any of examples 8-9 wherein the user interface 700 includes a record and auto share option 740, which when selected, causes the goggle to begin recording video, automatically send the video to the networked processing services 145, and share the video with selected users 819, 821.

11. In example 11, a method 900 includes capturing video 920 from multiple cameras supported by a virtual reality goggle while being worn by a user, the video including a composite field of view of approximately 360 degrees, transmitting 930 the received video to networked processing services for stitching the received video into a stereoscopic three dimensional virtual reality video, receiving the stitched stereoscopic three dimensional virtual reality video from the networked processing services 940, and displaying 945 the received stitched stereoscopic three dimensional virtual reality video in a display of the virtual reality goggle.

12. The method of example 11 and further comprising providing a user interface 700 on the display, the user interface including a record option selector 710 and an option 730 to share the stereoscopic three dimensional virtual reality video.

13. The method of example 12 wherein the user interface 700 includes a set up option 735 to identify the networked processing services and the users 815, 817, 819, 821, and 825 with which to share the stereoscopic three dimensional virtual reality video.

14. The method of example 13 wherein the user interface 700 includes a record and auto share option 740, which when selected, causes the goggle to begin recording video 920, automatically send the video to the networked processing services 930, and share the video with selected users 955.

15. The method of any of examples 11-14 wherein the virtual reality goggle comprises a goggle shaped body 110 with a support for holding the body on the wearer, and wherein the video including a composite field of view of approximately 360 degrees about the goggle shaped body is provided by multiple cameras including a first body camera 130 supported on a left side of the body and a second body camera 132 supported on a right side of the body providing left and right oriented fields of view, a third body camera 139 supported on a front face of the body providing a forward oriented field of view, a fourth body camera 137, 138 supported on a top face of the body providing an upward oriented field of view, and wherein the support comprises two stems 120, 122, each stem coupled to different sides of the body at one end of each stem, and a strap 125 coupling the other ends of each stem to each other, wherein the multiple cameras 134, 136 included in the support are supported by the strap and provide rearward oriented fields of view.

16. In example 16, a computer readable storage device 1003 has instruction stored thereon for execution by circuitry 1002 to perform operations. The operations include capturing 920 video from multiple cameras supported by a virtual reality goggle while being worn by a user, the video including a composite field of view of approximately 360 degrees, transmitting 930 the received video to networked processing services for stitching the received video into a stereoscopic three dimensional virtual reality video, receiving 940 the stitched stereoscopic three dimensional virtual reality video from the networked processing services, and displaying 940 the received stitched stereoscopic three dimensional virtual reality video in a display of the virtual reality goggle.

17. The computer readable storage device of example 16 wherein the operations further comprise providing a user interface 700, 945 on the display, the user interface including a record option selector 710 and an option 730 to share the stereoscopic three dimensional virtual reality video.

18. The computer readable storage device of any of examples 16-17 wherein the user interface includes a set up option 735 to identify the networked processing services and the users 815, 817, 819, 821, 825 with which to share the stereoscopic three dimensional virtual reality video.

19. The computer readable storage device of example 18 wherein the user interface 700 includes a record and auto share option 740, which when selected, causes the goggle to begin recording video, automatically send the video to the networked processing services, and share the video with selected users.

20. The computer readable storage device of any of examples 16-19 wherein the circuitry comprises a smart phone 140.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A virtual reality goggle comprising:
a goggle shaped body having a first pair of cameras having overlapping fields of view, mounted thereon;
a left display and a right display supported by the goggle shaped body in a position viewable by a wearer of the goggle shaped body;
a support extending between left and right sides of the goggle shaped body, the support including a second pair of cameras configured to provide images having respective overlapping fields of view; and
circuitry configured to:
receive video from the first pair of cameras and the second pair of cameras, the video comprising a composite field of view of approximately 360 degrees about the goggle;
communicate with a wireless communication device to transmit the received video to networked processing services;
receive stitched stereoscopic three dimensional virtual reality video from the networked processing services; and
provide the received stitched stereoscopic three dimensional virtual reality video for display using the left display and the right display.

2. The virtual reality goggle of claim 1 wherein the goggle shaped body has the second pair cameras supported on a left side of the body and a third pair of cameras supported on a right side of the body providing respective left and right oriented fields of view.

3. The virtual reality goggle of claim 2 wherein the goggle shaped body has the first pair of cameras supported on a front face of the body providing a forward oriented field of view.

4. The virtual reality goggle of claim 3 wherein the goggle shaped body has a fourth pair of cameras supported on a top face of the body providing respective images having overlapping fields of view in an upward direction.

5. The virtual reality goggle of claim 4 wherein the support comprises two stems, each stem coupled to a different side of the goggle shaped body at one end of each stem, and a strap coupling the other ends of each stem to each other, wherein the second and third pairs of cameras are supported, respectively, by the two stems and a fifth pair of cameras is supported by the strap and provides a rearward oriented field of view.

6. The virtual reality goggle of claim 1 wherein the wireless communication device comprises a cellular transceiver.

7. The virtual reality goggle of claim 6 wherein the cellular transceiver comprises a smart phone supported by the goggle shaped body.

8. The virtual reality goggle of claim 1 wherein the circuitry is configured to provide a user interface including a record option selector and an option to share the stereoscopic three dimensional virtual reality video.

9. The virtual reality goggle of claim 8 wherein the user interface includes a set up option to identify the networked processing services and the users with which to share the stereoscopic three dimensional virtual reality video.

10. The virtual reality goggle of claim 8 wherein the user interface includes a record and auto share option, which when selected, causes the goggle to begin recording video, automatically send the video to the networked processing services, and share the video with selected users.

11. A method comprising:
   capturing video from multiple pairs of cameras, the cameras in each pair of cameras having respective overlapping fields of view, the multiple pairs of cameras being supported by a virtual reality goggle while being worn by a user, the video including a composite field of view of approximately 360 degrees;
   transmitting, the received video to networked processing services for stitching the received video into a stereoscopic three dimensional virtual reality video;
   receiving the stitched stereoscopic three dimensional virtual reality video from the networked processing services; and
   displaying the received stitched stereoscopic three dimensional virtual reality video using a left display and a right display of the virtual reality goggle.

12. The method of claim 11 and further comprising providing a user interface on the display, the user interface including a record option selector and an option to share the stereoscopic three dimensional virtual reality video.

13. The method of claim 12 wherein the user interface includes a set up option to identify the networked processing services and the users with which to share the stereoscopic three dimensional virtual reality video.

14. The method of claim 13 wherein the user interface includes a record and auto share option, which when selected, causes the goggle to begin recording video, automatically send the video to the networked processing services, and share the video with selected users.

15. The method of claim 11 wherein the virtual reality goggle comprises a goggle shaped body with a support for holding the body on a wearer, and wherein the video including a composite field of view of approximately 360 degrees about the goggle shaped body is provided by the multiple pairs of cameras including a first pair of body cameras supported on a left side of the body and a second pair of cameras supported on a right side of the body providing, respective left and right oriented fields of view, a third pair of cameras supported on a front face of the body providing a forward oriented field of view, a fourth pair of cameras supported on a top face of the body providing an upward oriented field of view, and wherein the support comprises two stems, each stem coupled to different sides of the body at one end of each stem, and a strap coupling the other ends of each stem to each other, wherein the multiple pairs of cameras include a fifth pair of cameras supported by the strap and providing a rearward oriented field of view.

16. A computer readable storage device having instruction stored thereon for execution by circuitry to perform operations comprising:
   capturing video from multiple pairs of cameras, the cameras in each pair of cameras having respective overlapping fields of view, the multiple pairs of cameras being supported by a virtual reality goggle while being worn by a user, the video including a composite field of view of approximately 360 degrees;
   transmitting the received video to networked processing services for stitching the received video into a stereoscopic three dimensional virtual reality video;
   receiving the stitched stereoscopic three dimensional virtual reality video from the networked processing services; and
   displaying the received stitched stereoscopic three dimensional virtual reality video using a left display and a right display of the virtual reality goggle.

17. The computer readable storage device of claim 16 wherein the operations further comprise providing a user interface on the display, the user interface including a record option selector and an option to share the stereoscopic three dimensional virtual reality video.

18. The computer readable storage device of claim 17 wherein the user interface includes a set up option to identify the networked processing services and the users with which to share the stereoscopic three dimensional virtual reality video.

19. The computer readable storage device of claim 18 wherein the user interface includes a record and auto share option, which when selected, causes the goggle to begin recording video, automatically send the video to the networked processing services, and share the video with selected users.

20. The computer readable storage device of claim 16 wherein the circuitry comprises a smart phone.

* * * * *

UNITED STATES PATENT AND TRADEMARK OFFICE
CERTIFICATE OF CORRECTION

PATENT NO. : 9,823,477 B1  
APPLICATION NO. : 15/144112  
DATED : November 21, 2017  
INVENTOR(S) : Tian Shen Page 1 of 1

It is certified that error appears in the above-identified patent and that said Letters Patent is hereby corrected as shown below:

On the Title Page

In item (22), in "Filed", in Column 1, Line 1, after "2016", insert --¶(65) Prior Publication Data US 2017/0315365 A1 Nov. 02, 2017--

In the Specification

In Column 4, Line 47, delete "110," and insert --100,-- therefor

In Column 6, Line 43, delete "Mipi®" and insert --mipi®-- therefor

In Column 6, Line 44, delete "strip" and insert --strap-- therefor

In Column 10, Line 39, delete "815" and insert --825-- therefor

Signed and Sealed this  
Eleventh Day of June, 2019

Andrei Iancu  
*Director of the United States Patent and Trademark Office*